United States Patent [19]

Parkyn

[11] 3,737,809

[45] June 5, 1973

[54] MODULATED CARRIER FREQUENCY SOURCES

[75] Inventor: John Michael Parkyn, St. Albans, Hertfordshire, England

[73] Assignee: Marconi Instruments Limited, London, England

[22] Filed: Sept. 8, 1971

[21] Appl. No.: 178,639

[30] Foreign Application Priority Data

Sept. 23, 1970 Great Britain....................45,321/70

[52] U.S. Cl. ..................332/31 R, 332/37 R, 332/41

[51] Int. Cl. ..............................................H03c 1/06

[58] Field of Search..................332/41, 38, 37, 37 D, 332/50, 31, 3 TT

[56] References Cited

UNITED STATES PATENTS

| | | | |
|---|---|---|---|
| 2,906,970 | 9/1959 | Wylde | 332/38 X |
| 3,032,724 | 5/1962 | Oswald | 332/41 X |
| 3,486,128 | 12/1969 | Lohrmann | 332/37 R X |

*Primary Examiner*—Alfred L. Brody
*Attorney*—Donald M. Wight, Charles E. Brown and Vincent L. Ramik

[57] ABSTRACT

An amplitude modulated carrier frequency source has a first modulator and a first differential amplifier in a feedback loop of the first modulator, and a second modulator and a second differential amplifier in a feedback loop of the second modulator. A high level carrier frequency is applied to the second modulator and a further input of the second differential amplifier is derived from the modulating frequency. Another carrier frequency is applied to the first modulator whose associated differential amplifier has, as a further input, stabilizing output from the second modulator. A reference is thus achieved for modulation and carrier level that is a modulated carrier.

8 Claims, 3 Drawing Figures

Figure 3:
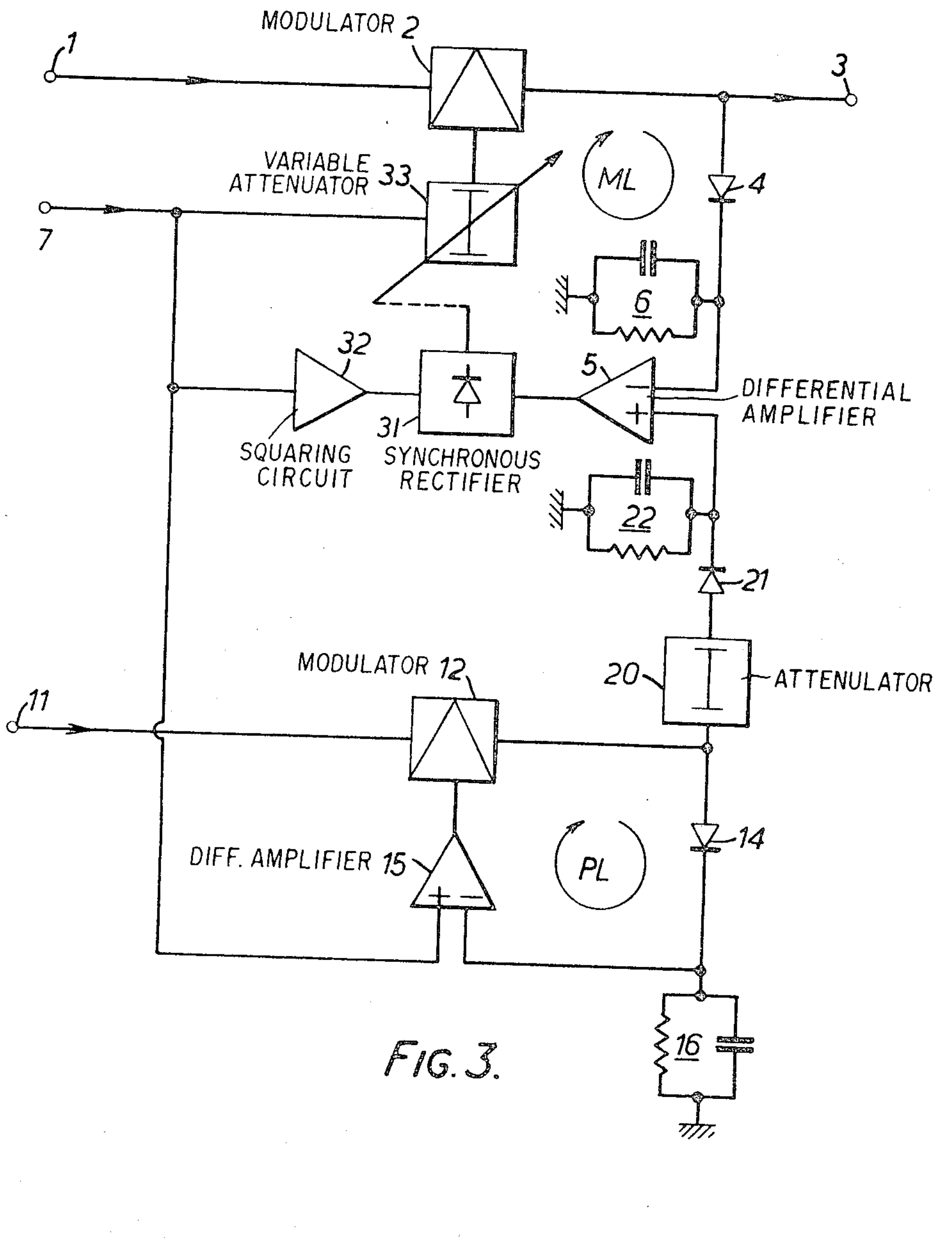

Patented June 5, 1973 3,737,809
2 Sheets-Sheet 1
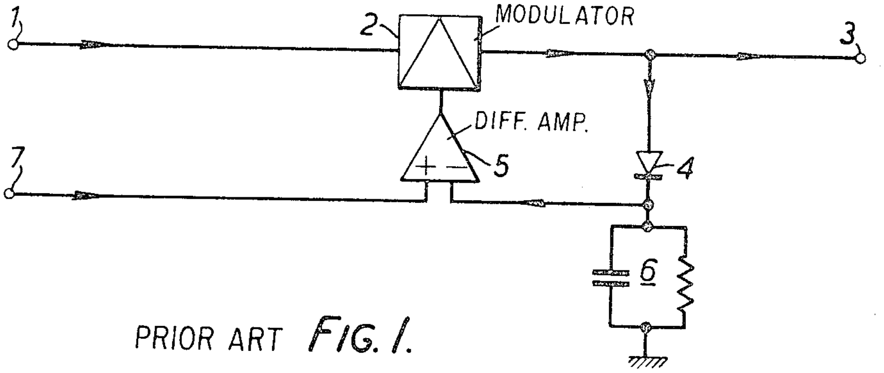
PRIOR ART FIG. 1.
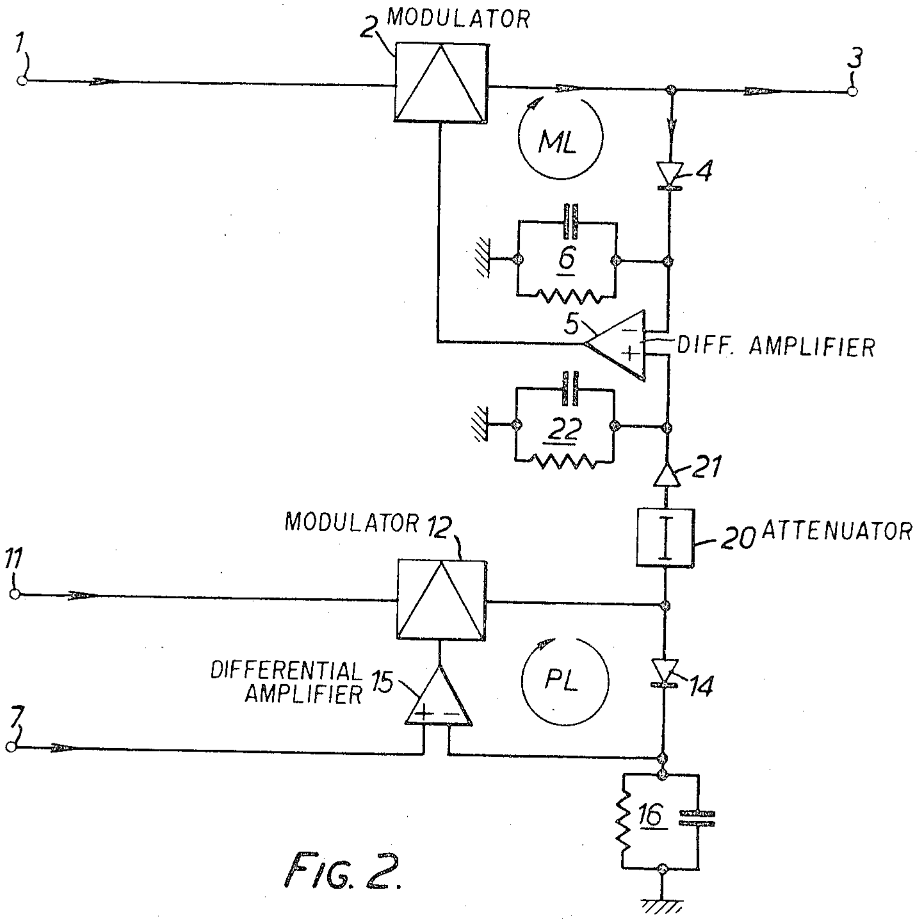
FIG. 2.
INVENTOR
John Michael Parkyn
BY
Baldwin Wight & Brown
ATTORNEYS INVENTOR
John Michael Parkyn
BY
Baldwin Wight & Brown
ATTORNEYS

MODULATED CARRIER FREQUENCY SOURCES

This invention relates to amplitude modulated carrier frequency sources.

It is often required, for example in signal generator equipments for testing and similar purposes, to provide an amplitude modulator which is of known constant sensitivity over a wide range of carrier frequencies and over a wide range of modulating (usually audio) frequencies in order that a predetermined modulation depth of a high degree of accuracy may be obtained. Considerable difficulties are experiences in some circumstances in satisfying this requirement.

FIG. 1 of the accompanying drawings, which figure is provided for purposes of preliminary discussion, is a simplified block diagram of a known amplitude modulator such as might form part of a known testing signal generator equipment which includes also a generator proper (not shown) adapted to provide any desired selectable high frequency within a wide range of frequencies and any desired selectable modulating frequency within a wide range of modulating (e.g. audio) frequencies, the selected high frequency and modulating frequencies being usually obtained, in well known manner, (not shown) by selection from the frequencies which the generator can produce directly and by frequency mixing.

Referring to FIG. 1, a carrier input, which is a selected high frequency from the generator proper (not shown), is applied from terminal 1 to an amplitude modulator 2. Modulated carrier output from 2 is taken off for utilization from an output terminal 3 and is also fed to a detector 4 the detector output from which provides one input to a differential amplifier 5. A time constant circuit 6, shown as consisting simply of a resistance and a capacitance in parallel, is associated with the detector. Modulating (audio) input from the generator proper is fed in at terminal 7, and provides the second input to the differential amplifier 5 the output from which stabilizes, in any convenient manner known per se, the modulation level in the modulator 2.

The known arrangement of FIG. 1 will not operate satisfactorily unless two conditions are satisfied, namely 1) that the carrier frequency at terminal 1 is much higher than the modulating frequency at terminal 7 so that the time constant of circuit 6 can be made long relative to the period of the carrier frequency and short relative to the period of the modulating frequency and 2) the amplitude of the modulated carrier is large enough for the detector 4 to operate substantially linearly. To quote a typical practical figure, if the carrier level is about 10 volts it is comparatively easy to obtain good linearity from the detector 4. By choosing a high ratio of carrier to modulating frequency it is also comparatively easy to ensure that the detector filter (the time constant circuit 6) will produce only a very small phase shift in the stabilizing negative feed back loop which extends from the output side of the modulator 2 through the detector 4 and the differential amplifier 5. If, however, the foregoing conditions are not satisfied the arrangement of FIG. 1 becomes unsatisfactory and will not give the required accurately maintained modulation depth for all carrier and modulating frequencies in the working range.

According to this invention an amplitude modulated carrier frequency source comprises a first amplitude modulator to which a first carrier frequency is applied and in which said first carrier frequency is amplitude modulated and a first differential amplifier adapted and arranged to stabilize the modulation level in said first modulator, said first differential amplifier having one input which is obtained by detecting the modulated output from said first modulator and a second input which is obtained by detecting a second stabilized level amplitude modulated carrier frequency.

Means for deriving the second stabilized level amplitude modulated carrier frequency preferably comprise a second amplitude modulator, means for applying a relatively large amplitude second carrier frequency thereto, and a second differential amplifier adapted and arranged to stabilize the modulation level in said second modulator, said second differential amplifier having one input which is obtained by detecting the output from said second modulator and a second input constituted by the modulating frequency.

In a signal generator equipment which also includes a generator proper adapted to generate a plurality of selectable high frequencies and modulating frequencies the two carrier inputs to the two amplitude modulators are two of the selectable frequencies produced by said generator proper and the modulating frequency is one of the selectable audio frequencies produced thereby.

In one way of carrying out the invention the output from the first differential amplifier is applied as a stabilizing control signal to the first modulator.

In another way of carrying out the invention the output from the first differential amplifier is employed as one input to a synchronous rectifier the second input to which is of modulating frequency and the output from which is employed to vary the amplitude of a modulating frequency input to the first modulator. This may be achieved by varying the attenuation of an attenuator through which said modulating frequency is applied to said first modulator. Preferably the modulating frequency input to the synchronous rectifier is a squared wave input.

The invention is illustrated in FIGS. 2 and 3 of the accompanying drawings which show, in similar manner to FIG. 1, two embodiments thereof.

Referring to FIG. 2 it will be seen that in this arrangement there are two feedback loops of which one, ML is termed the main loop and the other, PL is termed the pilot loop, each including a detector and a differential amplifier.

Two different carriers are applied at terminals 1 and 11. To quote practical figures for a testing signal generator equipment they might be any (different) selected frequencies between, say, 10 Kc/s and 500 Mc/s. By choosing a high ratio of carrier frequency at 11 to audio frequency at 7, and by making the level of the carrier to the modulator 12, herein termed the second modulator, relatively large — e.g. about 10 volts — good linearity of the detector 14 in the pilot loop can be obtained while the time constant of the time constant circuit 16 may readily be chosen at such value that the phase shift in the pilot loop is quite small. The pilot loop is the loop including the differential amplifier 15 which is herein called the second differential amplifier. The second input to amplifier 15 is the modulating input from 7 and its output stabilizes the level in modulator 12 in the same way as in the known single loop circuit of FIG. 1.

The modulator 12, which is a high level modulator and can be, as already explained, readily arranged to give good stabilization of level, feeds its output to an attenuator 20 which can be adjusted to the precise level — to give a practical figure, about 200 mV — required for one input to the differential amplifier 5, herein called the first differential amplifier in the main loop. This amplifier is of high gain and receives the input just mentioned through the added detector 21 with which is associated the time constant circuit 22. The second input to amplifier 5 is obtained by detecting by a detector 4, with which is associated a time constant circuit 6, the output from the first modulator 2, the output from amplifier 5 effecting level stabilization of the said modulator 2. It will be seen, therefore, that what may be called the "reference" for modulation and carrier level in the main loop of FIG. 2 is a modulated carrier (from 12) whereas the "reference" in the known single loop circuit of FIG. 1 is D.C. and audio. The detectors 4 and 21 of FIG. 2 are chosen to be as nearly identical as practicable. They will inevitably both have some degree of non-linearity but then outputs are brought near to balance by the high gain amplifier 5 and undesired distortion, non-linearity and temperature effects in one will be compensated to a satisfactorily high degree by corresponding effects in the other.

If the amplifier 5 of FIG. 2 is of sufficiently high gain to ensure really good automatic carrier levelling and modulation depth accuracy where may be a tendency to loop oscillations caused by the time constant of the time constant circuit 6. If difficulties of this nature are experienced when meeting a required specification they may be avioded by adopting the modification shown in FIG. 3. This differs from FIG. 2 in that a servo control is used for the first modulator 2. In FIG. 3 output from the high gain differential amplifier 5 is fed as one input to a synchronous rectifier 31 the second input to which is derived by passing modulating audio frequency from terminal 7 through a squaring circuit 32. The D.C. output from 31 is employed, as indicated conventionally by a broken line leading to an arrow, to vary the attenuation of a variable attenuator 33 in series in a modulating frequency input lead between terminal 7 and the control input lead of modulator 2. Because, unlike FIG. 2, the main loop of FIG. 3 is not an instantaneous envelope-following feedback system, the problem of loop oscillations due to phase shift in the detectors is avoided.

I claim:

1. In an amplitude modulated carrier frequency source, the combination of:

amplitude modulator means having a pair of input terminals and an output terminal for producing an output signal at said output terminal which is obtained by modulating the amplitude of a first carrier frequency signal at one input terminal in accordance with a signal at the other input terminal;

a differential amplifier having an output terminal connected to said other input terminal of said amplitude modulator means, and having first and second input terminals;

first detector means connected between the output terminal of said amplitude modulator means and said first input terminal of said differential amplifier for stabilizing the modulation level in said amplitude modulator means; and compensating means connected to said second input terminal of said differential amplifier for producing a signal at the output terminal thereof which compensates for non-linearity of said first detector means, and including second detector means for detecting the envelope of a stabilized level, amplitude modulated second carrier frequency.

2. In a source as claimed in claim 1 and wherein said compensating means also includes a second amplitude modulator, means for applying a relatively large amplitude second carrier frequency thereto, and a second differential amplifier adapted and arranged to stabilize the modulation level in said second modulator, said second differential amplifier having one input which is obtained by detecting the output from said second modulator and a second input constituted by the modulating frequency.

3. A signal generator equipment as claimed in claim 2 which also includes a generator proper adapted to generate a plurality of selectable high frequencies and modulating frequencies the two carrier inputs to the two amplitude modulators are two of the selectable frequencies produced by said generator proper and the modulating frequency is one of the selectable audio frequencies produced thereby.

4. Apparatus as claimed in claim 3 and wherein output from the first differential amplifier is applied as a stabilizing control signal to the first modulator.

5. Apparatus as claimed in claim 3 and wherein the output from the first differential amplifier is employed as one input to a synchronous rectifier the second input to which is of modulating frequency and the output from which is employed to vary the amplitude of a modulating frequency input to the first modulator.

6. Apparatus as claimed in claim 5 and wherein said modulating frequency is applied to said first modulator through an attenuator which is arranged to be varied by output from said synchronous rectifier.

7. Apparatus as claimed in claim 6 and wherein the modulating frequency input to the synchronous rectifier is a squared wave input.

8. In an amplitude modulated carrier frequency source, the combination of:

amplitude modulator means having a pair of input terminals and an output terminal for producing an output signal at said output terminal which is obtained by modulating the amplitude of a first carrier frequency signal at one input terminal in accordance with a signal at the other input terminal;

a differential amplifier having an output terminal connected to said other input terminal of said amplitude modulator means, and having first and second input terminals;

first detector means connected between the output terminal of said amplitude modulator means and said first input terminal of said differential amplifier for stabilizing the modulation level in said amplitude modulator means;

second amplitude modulator means having a pair of input terminals and an output terminal for producing a signal at its output terminal which is obtained by modulating the amplitude of a second carrier frequency signal at one of its input terminals in accordance with a modulating signal at its other input terminal; and second detector means connected between the output terminal of said second modulator means and the other input terminal of said differential amplifier for compensating non-linearity of said first detector means.

* * * * *